(12) United States Patent
Seul et al.

(10) Patent No.: US 11,431,734 B2
(45) Date of Patent: Aug. 30, 2022

(54) ADAPTIVE RULE GENERATION FOR SECURITY EVENT CORRELATION

(71) Applicant: KYNDRYL, INC., New York, NY (US)

(72) Inventors: Matthias Seul, San Francisco, CA (US); Arjun Udupi Raghavendra, Zürich (CH); Tim Uwe Scheideler, Schoenenberg (CH); Tiziano Airoldi, Carnate (IT)

(73) Assignee: KYNDRYL, INC., New York, NY (US)

( * ) Notice: Subject to any disclaimer, the term of this patent is extended or adjusted under 35 U.S.C. 154(b) by 230 days.

(21) Appl. No.: 16/387,632

(22) Filed: Apr. 18, 2019

(65) Prior Publication Data

US 2020/0336497 A1    Oct. 22, 2020

(51) Int. Cl.
| | |
|---|---|
| *H04L 9/00* | (2022.01) |
| *H04L 9/40* | (2022.01) |
| *G06F 17/15* | (2006.01) |

(52) U.S. Cl.
CPC .......... *H04L 63/1416* (2013.01); *G06F 17/15* (2013.01); *H04L 63/1433* (2013.01)

(58) Field of Classification Search
CPC .. H04L 63/1416; H04L 63/1433; G06F 17/15
(Continued)

(56) References Cited

U.S. PATENT DOCUMENTS

| | | | |
|---|---|---|---|
| 8,423,894 | B2 | 4/2013 | Bhattacharya et al. |
| 9,848,008 | B2 | 12/2017 | Chauhan et al. |

(Continued)

FOREIGN PATENT DOCUMENTS

| | | |
|---|---|---|
| EP | 3588898 | 1/2020 |
| EP | 3588898 A1 | 1/2020 |

(Continued)

OTHER PUBLICATIONS

Hutchings et al., "Intelligence-Driven Computer Network Defense Informed by Analysis of Adversary Campaigns and Intrusion Kill Chains", International Journal of Critical Infrastructure Protection, Dec. 1, 2015, pp. 1-14.

Riesco et al., "Leveraging cyber threat intelligence for a dynamic risk framework", International Journal of Information Security, vol. 18, No. 6, Apr. 8, 2019, pp. 715-739.

(Continued)

*Primary Examiner* — Christopher J Brown
(74) *Attorney, Agent, or Firm* — Ken Han; Andrew M. Calderon; Roberts Calderon Safran & Cole, P.C.

(57) ABSTRACT

A computer-implemented method for dynamically identifying security threats comprising a cyber-attack chain composed of a sequence of partial cyber-attacks represented by attack patterns may be provided. The method comprises receiving a sequence of security events, determining, a first cyber-attack pattern by applying a set of predefined rules for detecting an indicator of compromise of a first partial cyber-attack of the cyber-attack chain—thereby, identifying a specific cyber-attack chain—and determining a type and an attribute in the pattern of the first partial cyber-attack. The method comprises further configuring at least one rule for a downstream partial cyber-attack in the specific cyber-attack chain based on the type and the attribute in the attack pattern of the first partial cyber-attack, and adding the at least one configured rule to the set of predefined rules to be used by the correlation engine for dynamically identifying security threats to information technology systems.

22 Claims, 8 Drawing Sheets

(58) Field of Classification Search
USPC .......................................................... 726/23
See application file for complete search history.

(56) References Cited

U.S. PATENT DOCUMENTS

| | | | |
|---|---|---|---|
| 10,003,605 B2 | 6/2018 | Muddu et al. | |
| 10,530,810 B2* | 1/2020 | Ettema | H04L 63/1491 |
| 10,855,700 B1* | 12/2020 | Jeyaraman | H04L 63/1425 |
| 11,258,818 B2* | 2/2022 | Vaidya | G06F 30/20 |
| 2016/0219066 A1 | 7/2016 | Vasseur et al. | |
| 2017/0187730 A1* | 6/2017 | Singla | H04L 63/1433 |
| 2017/0289191 A1* | 10/2017 | Thioux | H04L 63/1441 |
| 2018/0004958 A1* | 1/2018 | Reinecke | G06F 21/577 |
| 2018/0038669 A1 | 2/2018 | Hershey et al. | |
| 2018/0048667 A1 | 2/2018 | Tang et al. | |
| 2018/0069887 A1 | 3/2018 | Chauhan et al. | |
| 2018/0115569 A1 | 4/2018 | Anders, Jr. | |
| 2018/0219897 A1 | 8/2018 | Muddu et al. | |
| 2018/0234445 A1 | 8/2018 | Bhatt et al. | |
| 2018/0234457 A1 | 8/2018 | Rajkumar | |
| 2018/0248893 A1* | 8/2018 | Israel | H04L 63/1433 |
| 2018/0322283 A1* | 11/2018 | Puri | G06N 20/00 |
| 2018/0359267 A1 | 12/2018 | Hovor et al. | |
| 2019/0132344 A1* | 5/2019 | Lem | G06N 5/003 |
| 2020/0195672 A1* | 6/2020 | Mugambi | H04L 41/142 |

FOREIGN PATENT DOCUMENTS

| | | |
|---|---|---|
| WO | 2015127472 A2 | 8/2015 |
| WO | 2018071356 A1 | 4/2018 |
| WO | 2018177210 | 10/2018 |
| WO | 2018177210 A1 | 10/2018 |
| WO | 2020212093 A1 | 10/2020 |

OTHER PUBLICATIONS

Tounsi et al., "A survey on technical threat intelligence in the age of sophisticated cyber attacks", Computers & Security, vol. 72, Sep. 25, 2017, pp. 212-233.

International Search Report and Written Opinion for International Application No. PCTEP2020/058028, International Filing Date: Mar. 23, 2020, 11 pages.

Bryant et al., "A novel kill-chain framework for remote security log analysis with SIEM Software", Computers & Security, vol. 67, (2017), pp. 198-210.

Wikipedia, "Advanced persistent threat", printed on Feb. 7, 2019, 7 pages, https://en.wikipedia.org/wiki/Advanced_persistent_threat.

Tarnowski, "How to use cyber kill chain model to build cybersecurity", printed Aug. 29, 2018, 19 pages, https://www.linkedin.com/pulse/how-use-cyber-kill-chain-model-build-cybersecurity-ireneusz-t/.

Wikipedia, "Indicator of compromise", printed on Feb. 7, 2019, 1 page, https://en.wikipedia.org/wiki/indicator_of_compromise.

Wikipedia, "Kill chain", printed Feb. 7, 2019, 5 pages, https://en.wikipedia.org/wiki/Kill_chain#Computer_security_model.

MAEC™ 5.0 Specification, Core Concepts, Oct. 9, 2017, pp. 1-86.

International Search Report and Written Opinion issued in Application No. PCT/EP2020/058028 dated Sep. 28, 2021, 8 pages.

R. Riesco et al., "Leveraging cyber threat intelligence for a dynamic risk framework", International Journal of Information Security (2019) 18:715-739, https://doi.org/10.1007/s10207-019-00433-2, published Apr. 8, 2019, 25 pages.

Wiem Tounsi et al., "A survey on technical threat intelligence in the age of sophisticated cyberattacks", Computers and Security vol. 72, Jan. 2018 (Abstract), 3 pages.

* cited by examiner

ADAPTIVE RULE GENERATION FOR SECURITY EVENT CORRELATION

FIELD OF THE INVENTION

The invention relates generally to a method for identifying security threats, and more specifically, to a computer-implemented method for dynamically identifying security threats comprising a cyber-attack chain composed of a sequence of partial cyber-attacks represented by attack patterns. The invention relates further to a security information and event monitoring system for dynamically identifying security threats comprising a cyber-attack chain, and a computer program product.

BACKGROUND

Security attacks on IT infrastructures are one of the most challenging tasks, enterprise IT organizations face these days. The role of the chief information security officer (CISO) becomes more and more important for enterprise organizations. Most of the security information and event monitoring (SIEM) solutions available on the market require a set of complex correlation rules, monitored and tuned by highly skilled personnel, in order to identify and detect potential security threats which may lead to security incidents in at least a part of an organization. According to the general and data security regulation (GDPR), enterprises operating in the European Union may face high monetary charges if it becomes obvious that they have not protected their customers' data.

SIEM correlation rule engines usually demand comparably high system resource consumptions in form of CPU time and memory requirements, because correlation words are designed based on regex (regular expressions), filters and thresholds in order to match a set of conditions and cross dependencies that need to be checked, evaluated and assessed in real-time while, at the same time, a massive number of ingested security events are received and written to log files.

On average, security events and logs produced in a typical IT (information technology) environment, as well as, by security solutions end devices may vary between 1 k EPS (events per second) to 100 k EPS and may have to be correlated across a set of approximately on average 150 to 400 distinct rules. Hence, most of the technologies of SIEM systems have a very high demand on computer system resources.

Modern cyber-attacks no longer consist of individual incidents, but rather form a sequence of specific steps designed to analyze, breach and exploit modern IT infrastructures. These cyber-attack chains are also known in the literature as "cyber kill chains" or "cyber-attack kill-chains". Additionally, a correlation between security events to map a potential security threat across the a sequence of related cyber-attacks requires additional system resources and might also result in a system performance degradation due to low performing, as well as not properly tuned correlation rules.

A detection and re-mediation of these complex cyber-attacks typically require a foreign knowledge of the complete cyber-attack chain of specific incident steps. Failing to have full knowledge of the cyber-attack chains may risk missing compromise parts of the computing systems, allowing the hacker to continue or restart that breach.

In current SIEM systems, correlation rules are deployed and enabled to match a set of normalized past security event data against multiple values potentially along each of the stages of the cyber-attack chain. As an example, if the objective of a correlation rule is to support a use case which invites a threat scenario and cyber-attack, which involves all cyber-attack chain stages, the rules need to be configured in order to detect a set of "n" parsed attributes of each ingested and normalized event/log entry, against a predefined "m" set of values, with a system resource Dumont of $x*n*m$, wherein "x" is the number of stages of a cyber-attack chain.

In this context, some approaches have been tried to address this dilemma. Document WO 2015/127472 A2 discloses systems and methods for monitoring malware events in a computer networking environment. The methods include the steps of identifying a plurality of suspect objects, according to data about network transactions or computer operations suspected of being linked to a security risk. The suspected objects are transmitted to an expectation service operating on one or more general-purpose digital computers using an analytical service.

Additionally, the document US 2018/0234445 A1 discloses a technique which comprises receiving data identifying behavior anomalies that are exhibited by entries that are associated with a computer system. The technique includes associating the behavior anomalies with contexts based at least in part on threat intelligence to provide modified anomalies. Machine learning is used to classify the modified anomalies and to identify behavior anomalies.

However, all of these techniques assumed—more or less—to have unlimited compute capacities. A reflection of limited resources—in particular CPU time and memory—is not made. Thus, there remains a need for further optimized security information and event monitoring solutions also taking into account the limited availability of computing resources.

SUMMARY

According to one aspect of the present invention, a computer-implemented method for dynamically identifying security threats comprising a cyber-attack chain composed of a sequence of partial cyber-attacks represented by attack patterns may be provided. The method may comprise receiving a sequence of security events determining, in the received sequence of security events, a first cyber-attack pattern using a correlation engine by applying a set of predefined rules for a detection of an indicator of compromise of a first partial cyber-attack of the cyber-attack chain, thereby identifying a specific cyber-attack chain, and also determining a type and an attribute in the pattern of the first partial cyber-attack of the identified specific cyber-attack chain.

Additionally, the method may also comprise configuring at least one rule for a downstream partial cyber-attack in the specific cyber-attack chain based on the type and the attribute in the attack pattern of the first partial cyber-attack, and adding the at least one configured rule to the set of predefined rules to be used by the correlation engine for dynamically identifying security threats to information technology systems.

According to another aspect of the present invention, a security information and event monitoring (SIEM) system for dynamically identifying security threats comprising a cyber-attack chain may be provided. The system may comprise a receiving unit adapted for receiving a sequence of security events and a determination unit adapted for determining, in the received sequence of security events, a first cyber-attack pattern using a correlation engine by applying a set of predefined rules for a detection of an indicator of compromise of a first partial cyber-attack of the cyber-attack chain. Thereby, a specific cyber-attack chain may be identified. The determination unit may also be adapted for determining a type and an attribute in the pattern of the first partial cyber-attack of the identified specific cyber-attack chain.

Additionally, the SIEM system may comprise a configuration unit adapted for configuring at least one rule for a downstream partial cyber-attack in the specific cyber-attack chain based on the type and the attribute in the attack pattern of the first partial cyber-attack, and an adding module adapted for adding the at least one configured rule to the set of predefined rules to be used by the correlation engine for dynamically identifying security threats to information technology systems.

The proposed computer-implemented method for dynamically identifying security threats comprising a cyber-attack chain composed of a sequence of partial cyber-attacks represented by attack patterns may offer multiple advantages and technical effects:

Required computer resources for detecting and potentially preventing multi-stage cyber-attack chain may be reduced significantly. While a detection of a first element of a cyber-attack chain may be performed using a full set of rules for identifying all sorts of indicators of compromise, sub-sequence partial cyber-attacks belonging to a later stage of the cyber-attack chain may only require a reduced set of rules—or, in some cases—a modified set of rules to identify and determine indicators of compromise.

Because it is known that only a limited number of options may be available for a cyber-attack chain if a first partial attack has been received, it is not required to follow up on second stage or third stage (and so on) partial attacks with the original unmodified, full set of rules for identifying indicators of compromise. The inherited knowledge of cyber-attack chain and the sequence of partial attacks may be used to modify and—in particular—reduce the set of rules.

Thus, a determination of partial attacks which are meaningless as second or subsequent stages after a first partial attack may be eliminated. This may have a significant influence of the required computing resources, i.e., significantly less amounts of CPU time in memory are required to identify cyber-attack sequence with the same or even better accuracy. The accuracy of the detection of threat incidents may be possible because only limited amounts of computing resources may be available. Using the here proposed concept may enable a significant reduction of computing resources to achieve the same goal: identify cyber-attack chain. Thus, also with smaller and less powerful computing systems the same result may be achieved if compared to methods according to the state-of-the-art for detecting cyber-attack chain with an unmodified set of rules apply it again and again also to subsequent partial attacks.

In the following, additional embodiments of the inventive concept will be described.

According to one preferred embodiment, the method may also comprise determining, in the received sequence of security events, a second cyber-attack pattern using the correlation engine by applying the configured at least one rule for a detection of a second indicator of compromise in the second cyber-attack of the cyber-attack chain which has already been determined in a previous step. By this second step after the initial identification of a cyber thread the detection of the specific cyber-attack chain may be confirmed with less computational effort than always using the complete or extended set of rules.

According to one advantageous embodiment of the method, the set of rules may use information about malware attribute enumeration and characterization—known as MEAC—and structured threat information expressions—known as STIX. Thereby, the relational references between the indicator of compromise and attack patterns that are part of a cyber-attack chain may be used. The related information may be set to a repository being accessible by the proposed method and/or the related system.

According to one permissive embodiment, the method may also comprise updating the predefined rule set continuously by adding new indicators of compromise. In the industry, there is a pretty good approach in practice to mutually inform and update security defense centers on a regular basis. Once there has been identified a new attack pattern or campaign by one of the security defense centers other centers may be informed accordingly in a short period of time.

According to one additionally preferred embodiment of the method, the adding the at least one configured rule to the set of rules may be performed by selectively configuring and/or activating correlations rules—in particular those not relevant for a first attack but for the second an further downstream attacks—grouping of rules, and/or prioritizing the configured and added at least one rule against generic rules. Thus, a future behavior for a defense against cyber security threats may be defined, whereby at the same time, the effort required for an identification of future cyber security attacks of the same cyber-attack chain, i.e., a dedicated sequence of partial cyber-attacks, may be reduced significantly.

According to an optional embodiment of the method, the configuring the at least one rule for a downstream partial cyber-attack may also comprise using data about tactic-technique-procedure (TTP) identifying rules, malware attribute enumeration and characterization (MEAC) and structured threat information expressions (STIX) from a repository. Such a repository may be updated on a regular basis, if required, or on-demand in order to keep the respective information up-to-date.

According to one permissive embodiment of the method, the configuring the at least one rule for a downstream partial cyber-attack may also comprise configuring additional rules relating to typical downstream cyber-attacks of a cyber-attack chain relating to the determined type and attribute in the pattern of the first partial cyber-attack of the identified specific cyber-attack chain. Here again—in a modified way—future partial cyber-attacks of the identified specific cyber-attack chain may be anticipated in order to reduce the effort—and at the same time increase the speed—for a future identification. Hence, the complete arsenal of rules against all stages of the specific cyber-attack chain may be activated.

According to a further useful embodiment, the method may also comprise triggering an alarm signal after a predefined number of subsequent partial security attacks corresponding to one cyber-attack chain may have been determined. The predefined number may be "1", i.e., right after the identification of a first partial cyber-attack of an assumed cyber-attack chain. With such an alarm, cyber security officers may be alert and may be able to supervise and control the SIEM system more closely if required. In other embodiments, the alarm may be triggered if two or three partial cyber-attacks being identified to belong to the same cyber-attack chain. Thus, some of the activities of the SIEM system may be operated automatically until a threshold of partial cyber-attacks belonging together has been reached, while in case of other cyber-attack chains, the alarm may be triggered immediately after identifying the first cyber-attack of a known cyber-attack chain.

According to one additional, preferred embodiment, the method may also comprise removing the at least one configured rule for a downstream partial cyber-attack in the specific cyber-attack chain in the set of rules if it is determined that a risk value for the specific cyber-attack chain is reduced to below a predetermined risk threshold value. In an alternative or enhancing embodiment, the method may comprise removing the at least one configured rule for a downstream partial cyber-attack in the specific cyber-attack chain if the correlation engine using the at least one configured rule did not determine a downstream cyber-attack pattern for a predefined time, e.g., after a predefined number of days. This way, it may be ensured that the set of rules is not extended too much, so that too many correlations have to been checked and assessed which may be very time- and resource-consuming By removing those rules potentially no longer required, the SIEM system may be kept clean and effective. The information about the absence of an observation of the corresponding cyber-attack pattern is fed back into the repository of malware enumeration and characterization and structured threat information expressions (MEAC). Thus, a feedback loop to a higher level of threat definitions may be established. Also this provision ensures a lean and resource-friendly SIEM system.

According to one further optional embodiment, the method may also comprise removing a rule relating to at least one configured rule from a downstream partial cyber-attack in the specific cyber-attack chain in the set of rules from the repository of malware attribute enumeration and characterization and structure threat information expressions. Again, this provision may ensure a lean and resource-friendly SIEM system.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
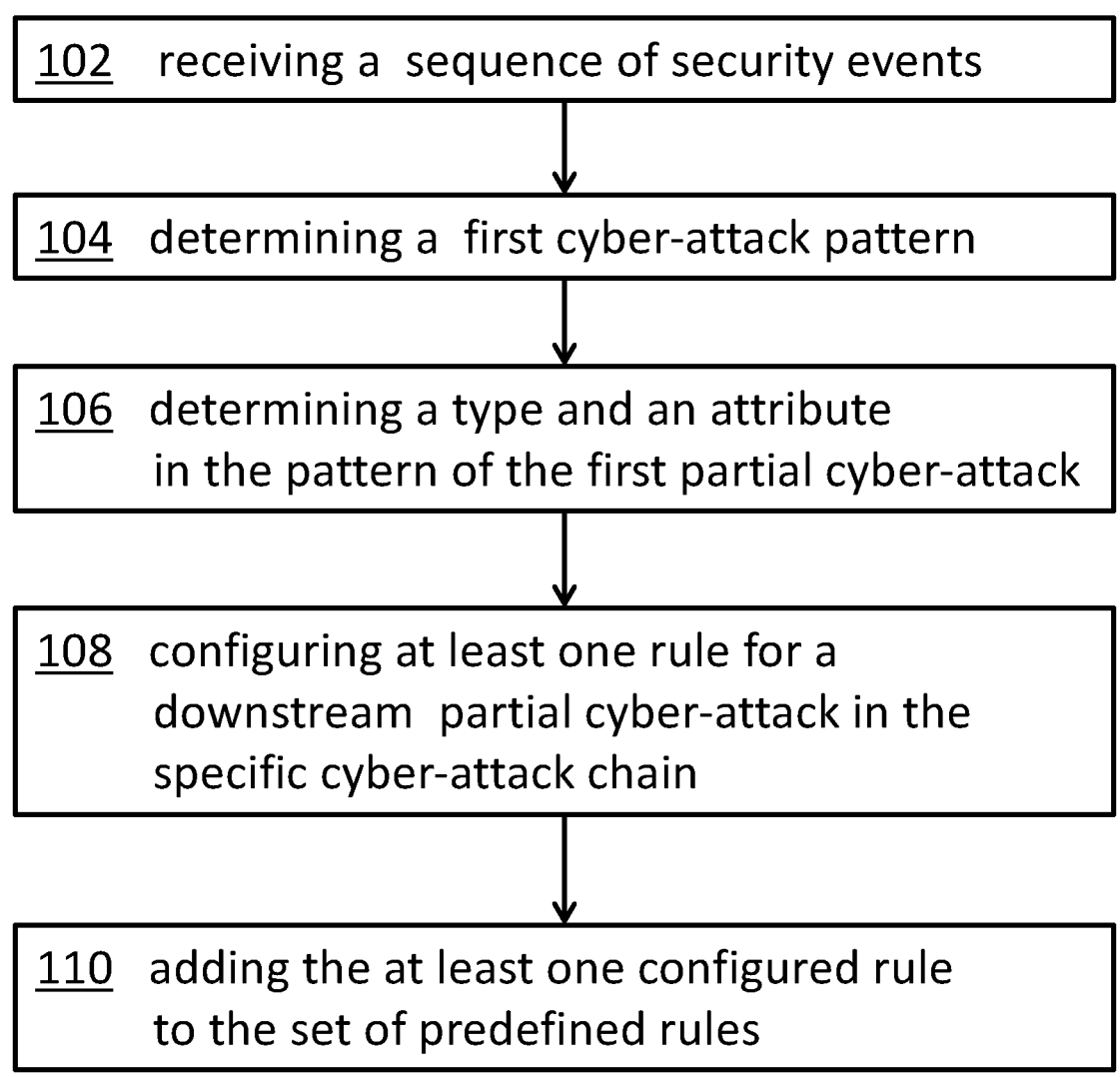

Preferred embodiments of the invention will be described, by way of example only, and with reference to the following drawings:

FIG. 1 shows a block diagram of an embodiment of the inventive computer-implemented method for dynamically identifying security threats comprising a cyber-attack chain composed of a sequence of partial cyber-attacks represented by attack patterns.

Figure 2:
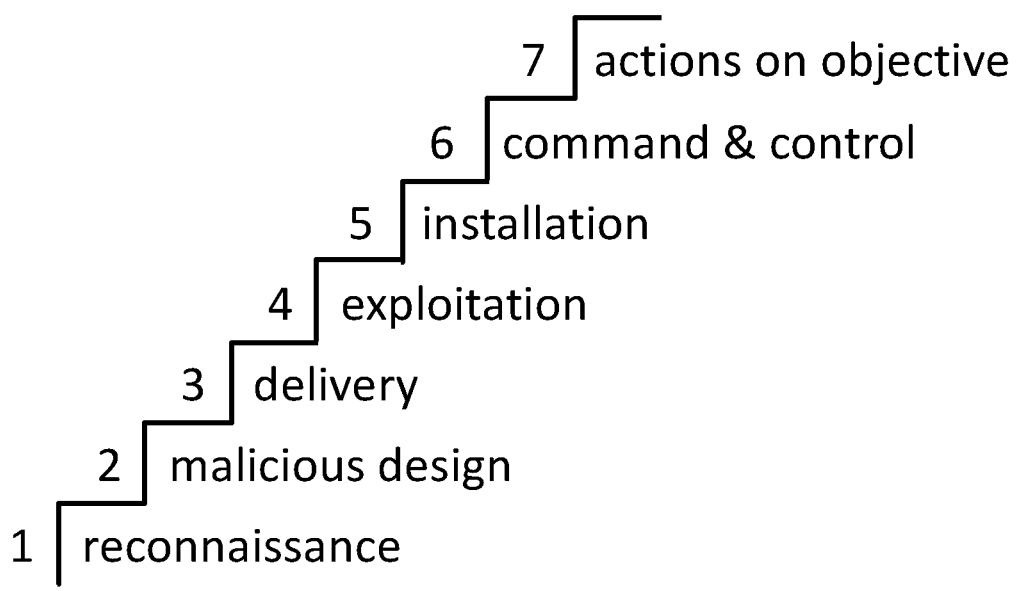

FIG. 2 shows a diagram of typical phases of cyber-attack chain.

Figure 3:
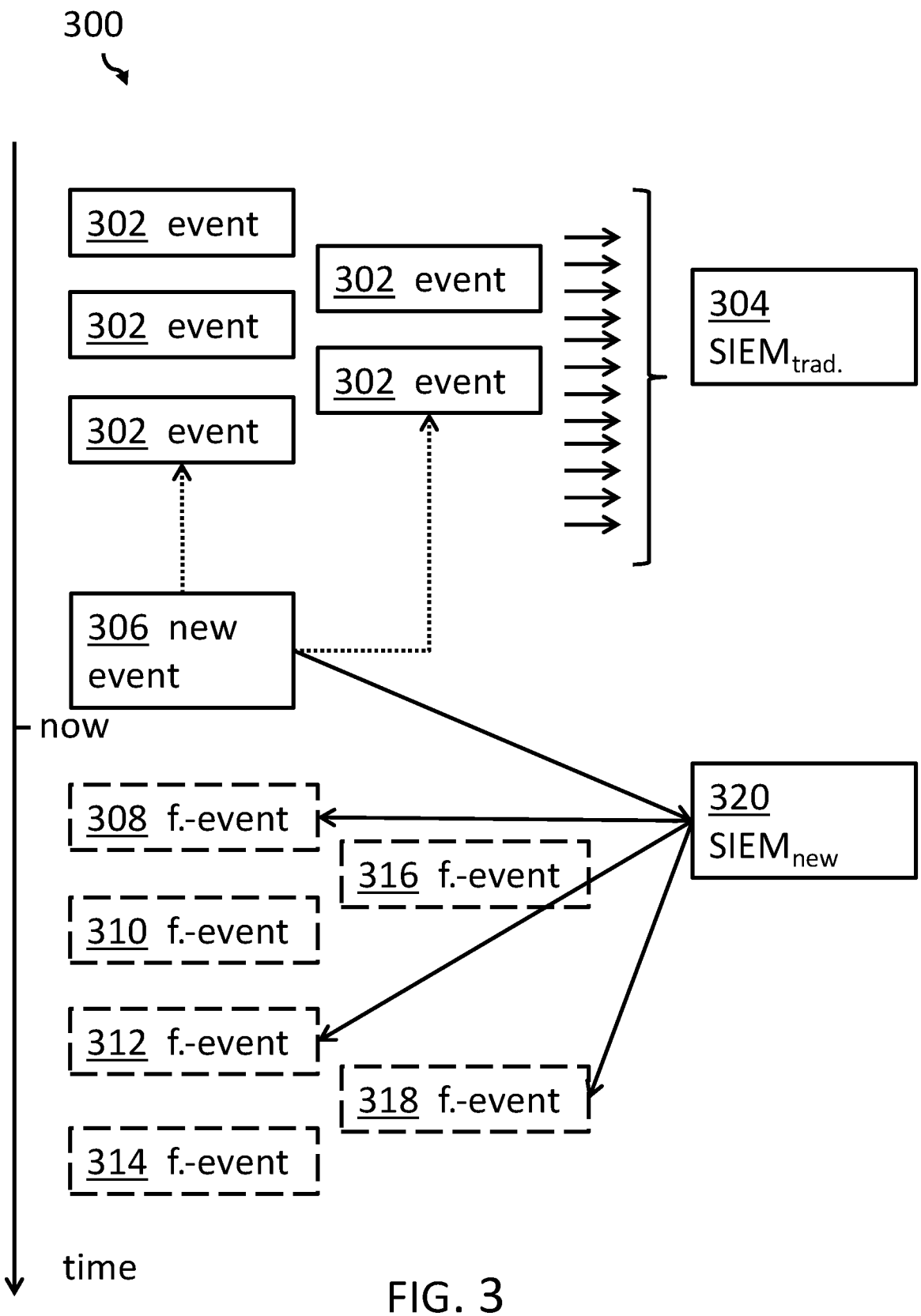

FIG. 3 shows a block diagram of a comparison of traditional incident detections and fundamentals of the proposed concept.

Figure 4:
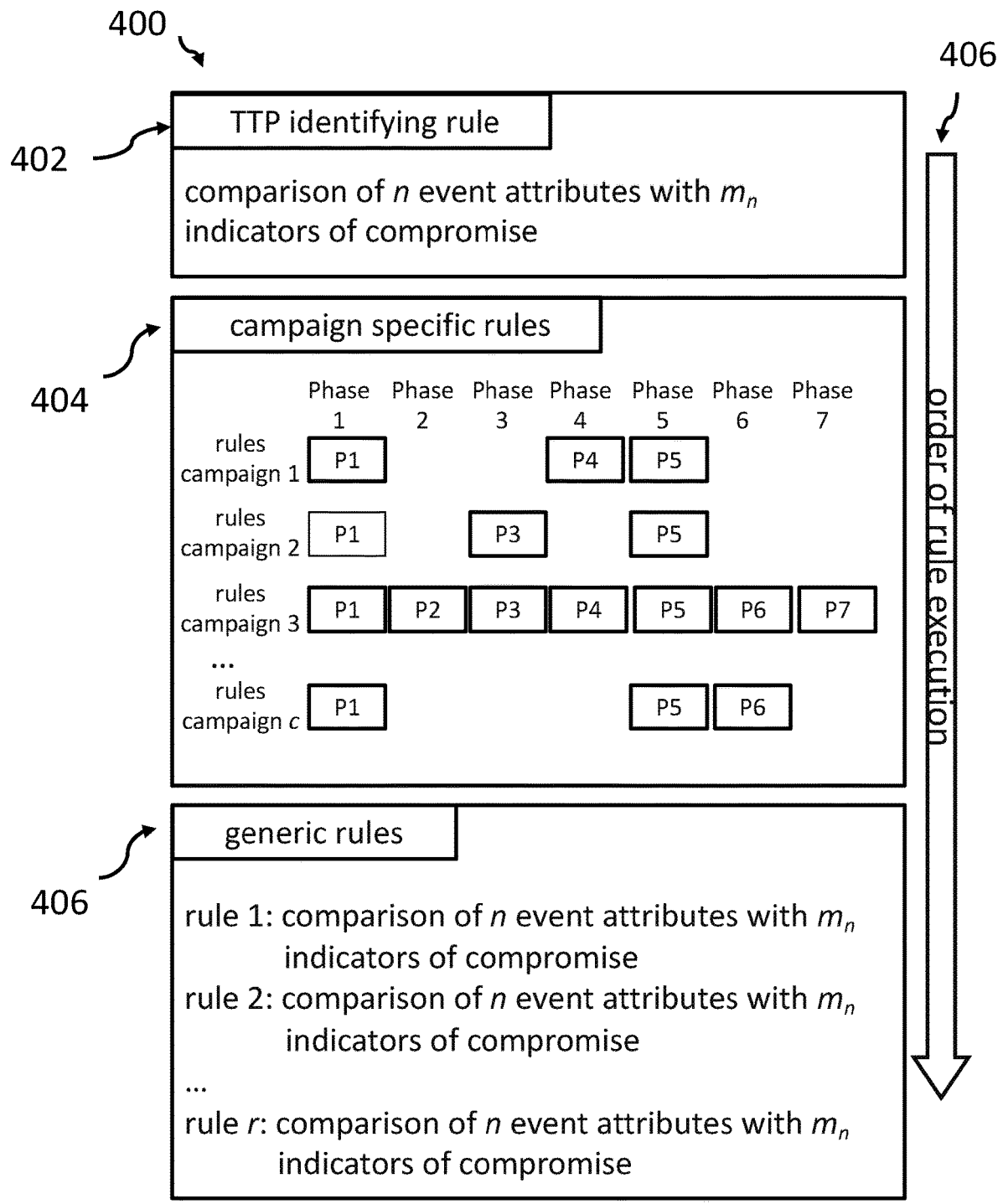

FIG. 4 shows a block diagram of an embodiment of the structure of the rules set with dynamically adaptive and fixed components.

Figure 5:
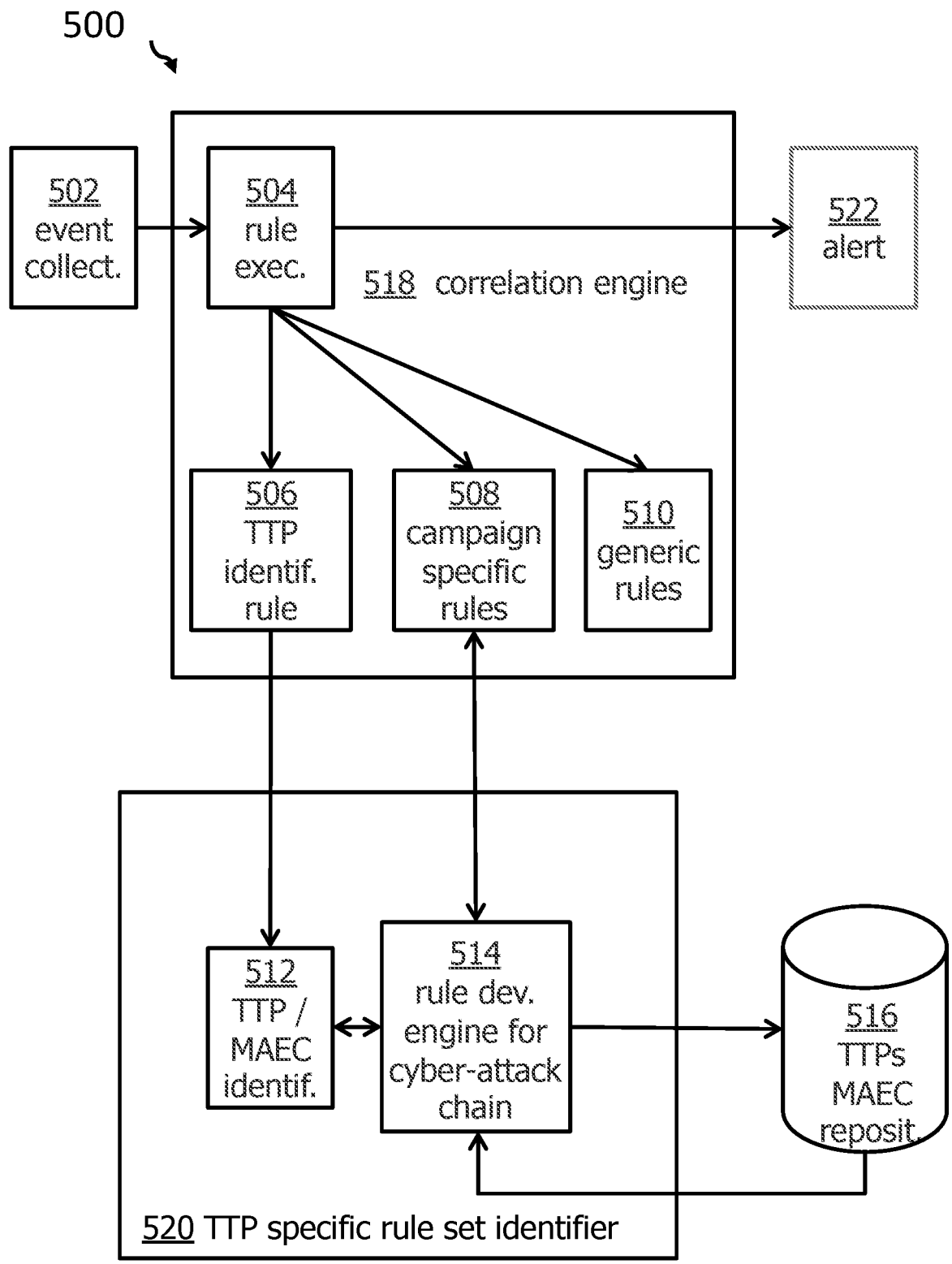

FIG. 5 shows a block diagram of an embodiment of the proposed concept using main building blocks.

Figure 6:
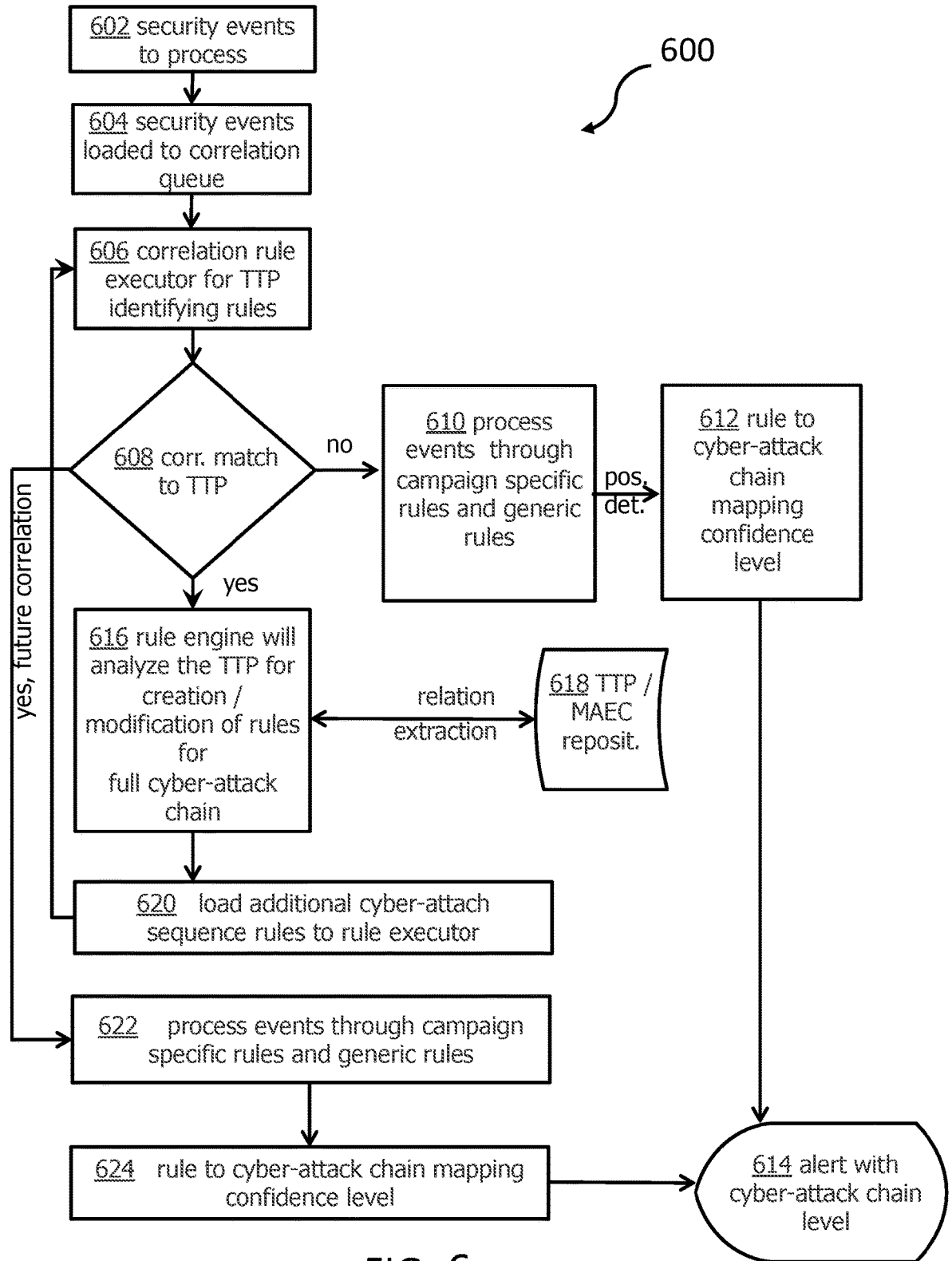

FIG. 6 shows a block diagram of a flowchart indicating the steps of the inventive concept from a more detailed perspective.

Figure 7:
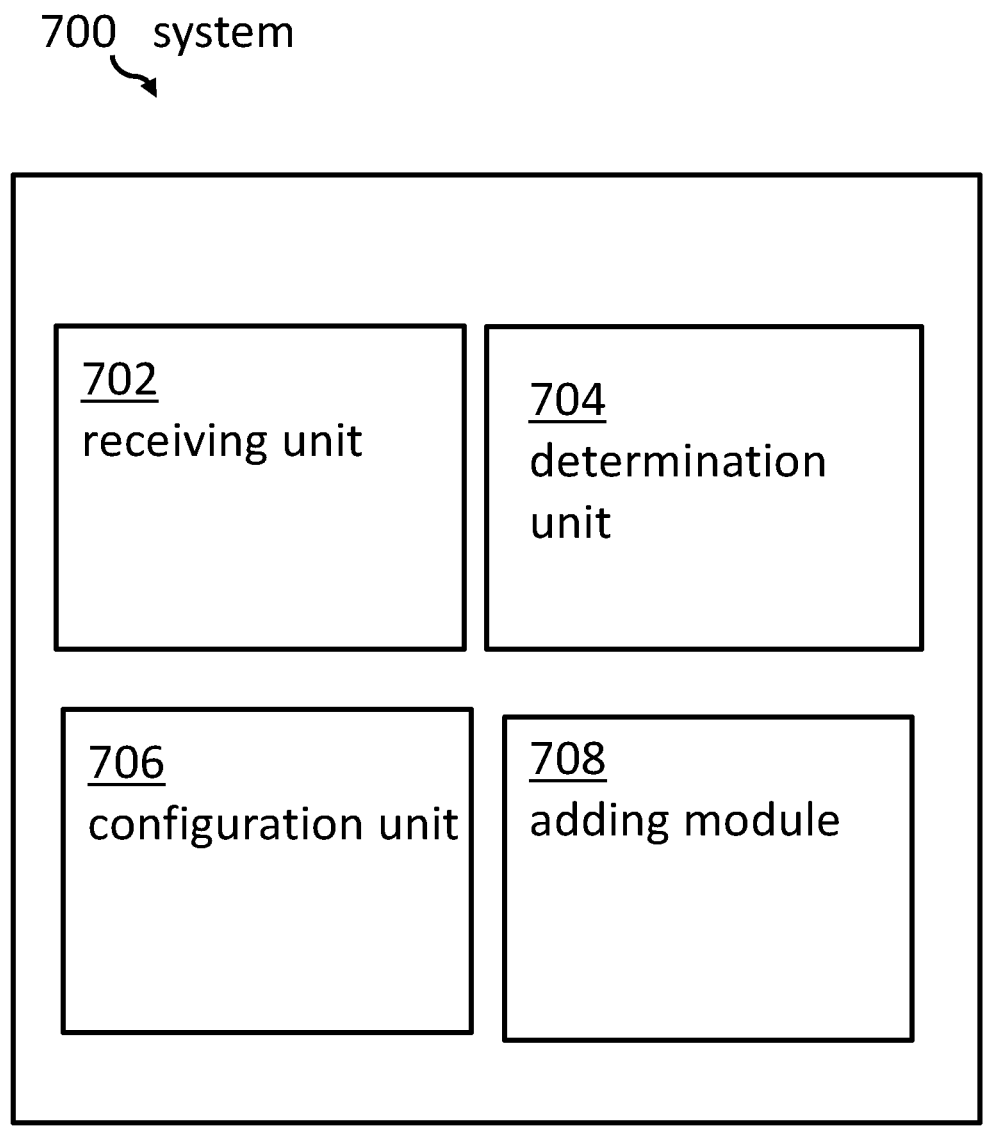

FIG. 7 shows a block diagram of the security information and event monitoring system for dynamically identifying security threats comprising a cyber-attack chain composed of a sequence of partial cyber-attacks represented by attack patterns.

Figure 8:
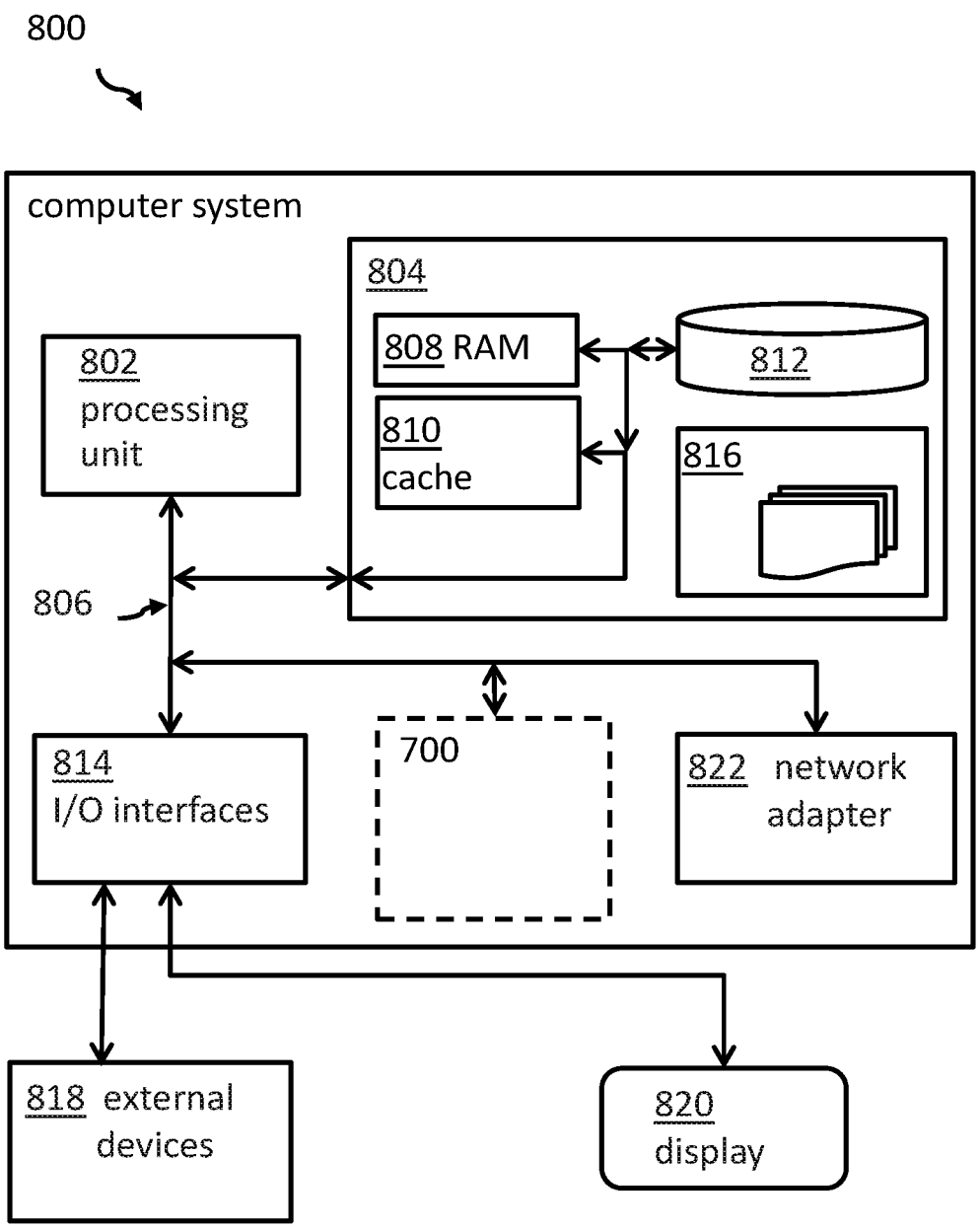

FIG. 8 shows a block diagram of an embodiment of a computing system suitable for executing program code related to the proposed method and comprising the system according to FIG. 7.

DETAILED DESCRIPTION

In the context of this description, the following conventions, terms and/or expressions may be used:

The term 'security threats' may denote a possible danger that might exploit a vulnerability to breach security of information technology systems and therefore cause possible harm. The term relates to the technical area of computer security and describes a potential attack, a non-allowed access or potential destruction or manipulation of data in computer or storage systems by an intruder or intruder system or take over control of the computer, storage or communication system. The security threads originate typically from a cyber-attack.

The term 'cyber-attack chain' may denote a sequence of sub-attacks to a computer or similar system. Each stage of the sequence builds on the previous one. There exist theoretical models with seven and also with 18 stages of a sequence or chain of cyber-attacks. In the course of this document the terms "sequence of partial cyber-attacks", "cyber-attack chain" may be used synonymously.

The term 'sequence of security events' may denote that each of the sequence of partial cyber-attacks may establish a breach of security measures of which most operate under the radar of simply cyber-attack defense systems. A first set of often not detected attacks is operational to investigate a potential target in order to take over control of the attacked system only in the last stage.

The term 'first cyber-attack pattern' may denote a first action of attack in the sequence of partial cyber-attacks. In the seven layer model of cyber-attack chain, this may relate to the reconnaissance stage or phase.

The term 'correlation engine' may denote a system enabled to correlate events with a predefined pattern, i.e., it is a technique for making sense of a large number of events and pinpointing the few events that are really important in that mass of information. This is accomplished by looking for and analyzing relationships between events and pre-defined patterns. A series of actions may be required to detect correlations, like filtering, aggregation, analysis, masking and the like. The correlation engine is adapted to execute a correlation mechanism.

The term 'set of predefined rules' may denote in the context of this document a group of rules with which log events of a security system in an IT environment tries to detect cyber attacks.

The term 'indicator of compromise' (IoC) may denote in computer forensics and IT security an artifact observed on a network or in an operating system that with high confidence indicates a computer intrusion. Typical IoCs are virus signatures and IP addresses, MD5 hashes of malware files or URLs or domain names of botnet command and control servers. After IoCs have been identified in a process of incident response and computer forensics, they can be used for early detection of future attack attempts using intrusion detection systems and antivirus software. Known indicators are usually exchanged within the industry.

The term 'downstream' may denote partial cyber-attacks subsequent to a current partial cyber-attack. E.g., if the current partial cyber-attack is the second in an expected row or sequence then downstream partial cyber-attacks are those following the second, i.e., the third, fourth, fifth and so on.

The term 'malware attribute enumeration and characterization' (MAEC) (pronounced "mike") is a community-developed structured language for encoding and sharing high-fidelity information about malware based upon attributes such as behaviors, artifacts, and relationships between malware samples. By eliminating the ambiguity and inaccuracy that currently exists in malware descriptions and by reducing reliance on signatures, MAEC aims to: (i) enable correlation, integration, and automation; (ii) improve human-to-human, human-to-tool, tool-to-tool, and tool-to-human communication about malware; (iii) allow for the faster development of countermeasures by enabling the ability to leverage responses to previously observed malware instances; and, (iv) reduce potential duplication of malware analysis efforts by researchers.

The term 'structured threat information expressions' (STIX) may denote a repository of collected expressions of cyber-security relevant expressions. STIX is a collaborative, community-driven effort to define and develop a structured language to represent cyber threat information. The STIX Language conveys the full range of potential cyber threat information and strives to be fully expressive, flexible, extensible, automatable, and as human-readable as possible. All interested parties are welcome to participate in evolving STIX as part of its open, collaborative community. STIX use-cases include (i) analyzing cyber threats; (ii) specifying indicator patterns for cyber threats; (iii) managing cyber threat prevention and response activities; (iv) sharing cyber threat information.

In the following, a detailed description of the figures will be given. All instructions in the figures are schematic. Firstly, a block diagram of an embodiment of the inventive computer-implemented method for dynamically identifying security threats comprising a cyber-attack chain composed of a sequence of partial cyber-attacks represented by attack patterns is given. Afterwards, further embodiments, as well as embodiments of the security information and event monitoring system for dynamically identifying security threats comprising a cyber-attack chain, will be described.

FIG. 1 shows a block diagram of an embodiment of the computer-implemented method 100 for dynamically identifying security threats comprising a cyber-attack chain—composed of a sequence of partial cyber-attacks represented by attack patterns. The method 100 comprises receiving, 102, a sequence of security events. The security events may be received from log sources from cyber-security surveillance systems or SIEM system.

The method 100 comprises—as a first step—determining, 104, in the received sequence of security events, a first cyber-attack pattern using a correlation engine by applying a set of predefined rules—in particular TTP rules, tactic-technique-procedure identifying rules—for a detection of an indicator of compromise of a first partial cyber-attack of the cyber-attack chain. The first partial cyber-attack thereby identifies a specific cyber-attack chain.

Furthermore, the method 100 comprises determining, 106, a type and an attribute—at least one of those sets—in the pattern of the first partial cyber-attack of the identified specific cyber-attack chain. Thus, a signature of a campaign may have been received.

Additionally, the method 100 comprises configuring, 108, at least one rule for a downstream partial cyber-attack in the specific cyber-attack chain based on the type and the attribute in the attack pattern of the first partial cyber-attack. Thus, the method prepares the SIEM system to anticipate future partial cyber-attacks, so that these may be identified with fewer resources and faster if compared to traditional SIEM system.

Last but not least, the method 100 comprises adding, 110, the at least one configured rule to the set of predefined rules to be used by the correlation engine for dynamically identifying security threats to information technology systems.

FIG. 2 shows a diagram 200 of typical phases of cyber-attack chain. It has turned out that typical cyber-security attacks like ransomware or trojans follow a certain sequence of actions building on each other and using the information from the step before. A typical seven step approach comprises:

1 reconnaissance—The intruder selects a target, researches it, and attempts to identify vulnerabilities in the target network.
2 malicious design—The intruder creates a remote access malware agent, such as a virus or worm, tailored to one or more vulnerabilities.
3 delivery—The intruder transmits the agent to the target (e.g., via e-mail attachments, websites or USB drives).
4 exploitation—A malware agent's program code triggers, which takes action on target network to exploit vulnerability.
5 installation—The malware agent installs access point (e.g., "backdoor") usable by intruder.
6 command & control—The malware enables intruder to have "hands on the keyboard" persistent access to target network.
7 actions on objective—The intruder takes action to achieve his goals, such as data exfiltration, data destruction, or encryption for ransom.

This knowledge can be used to reduce the effort for fighting cyber-security chain. In traditional approaches every security event from n different sources—in particular, IP addresses, email IDs, file hashes, URLs, etc.—have to be parsed against the complete known list of indicators of compromise from m malware campaigns—in particular also here, IP addresses, email IDs, file hashes, URLs, etc. This has to be multiplied by the number of steps involved in a typical campaign; thus, 7*n*m different determinations have to be made in order to protect an IT environment and requiring high system resource utilization.

With the here proposed concept, this effort may be reduced significantly: instead of security events from n different sources only security events parsed from a subset of n' different sources have to be searched for IP addresses, email ID file hashes, URLs, etc. This has to be multiplied with a known list of indicators of compromise for a subset of m' malware campaigns based on TTPs: thus, the product of seven*n' *m' is much smaller than the case of the above-mentioned 7*n*m different determinations. Hence, the proposed concept allows reducing system resource utilization for a protection against cyber-security threats significantly.

In summary, instead of brute-force processing events, an insight-based, active coordination of processing is applied. Through the optimized approach, a foot protection and a correlation of cyber-attack chain can be done in real-time within predefined SIEM resource constraints.

FIG. 3 shows a block diagram 300 of a comparison of traditional incident detections and fundamentals of the proposed concept. It may be noted that the time arrow starts at the top and goes down to the bottom of the figure. The upper half of the figure shows a traditional SIEM system 304 monitoring incoming security events 302. These are managed in the traditional way, typically without adopting any rules set based on previous partial cyber-attacks.

Thus, if a new event 306 is received at a "now" time, the traditional SIEM system 304 treats this new event 306 in the way the previous security events have been treated, i.e., according to more or less static rules.

In the lower half of the FIG. 3, a SIEM system 320 according to the proposed concept is sketched. Because cyber-security chains come according to certain phases with partial cyber-attacks, each of which may not represent a threat in itself, the new event 306 may be identified by the SIEM system 320 as a first cyber-attack in a sequence of partial cyber-attacks that may be received after the "now" time. Thus, the future events 308, . . . , 318 may be further phases of a complete cyber-attack chain. Now, based on the new event 306, the here proposed method as well as the proposed SIEM system 320, prepares itself by configuring rules to more easily identify—in the case of FIG. 3—the future events 308, 312 and 318 which are known to belong to the identified cyber-security chain. This way, the detection, identification and confirmation of a cyber security attack based on a chain of partial cyber-security attacks can be optimized and can be executed with fewer resources if compared to the traditional approach.

FIG. 4 shows a block diagram 400 of an embodiment of the structure of the rules set with dynamically adaptive and fixed components. Each of a set of TTP identifying rules 402 allow to compare n event attributes against $m_n$ indicators of compromise. The campaign specific rules 404 compare only one or the very few event attributes against a short list of indicators of compromise. The load from the campaign specific rules 404 is therefore tiny in comparison to the load induced by the generic rules. Finally, each of the generic rules 406 are related to comparisons of n event attributes with $m_n$ indicators of compromise.

A cyber-security attack may come in as a series of partial cyber-security attacks in the different phases—in particular phase 1 to phase 7—of the cyber-security attack. There may be a partial cyber-security attack in each of the phase P1 to P7; however, it may not be required that in each phase an individual partial cyber-security attack is performed. Thus, only campaign 3 shows rules for each of the seven phases.

Other campaigns, e.g., campaign 1, 2 or c—show only rules for a subset of the phases. Because it is typically known for which phase a new partial cyber-security attack can be expected, it may only be required to configure and activate a rule for the correlation engine in addressing those specific phases.

As an example, consider a ransomware campaign for which the TTP database comprises the following information:

Phase 1—Reconnaissance: Network scan from a malicious IP addresses a.b.c.d

Phase 2—Malicious design: Emails sent form the domain @benefit-city.com with the subject "mail for you" or "photo for you"

Phase 4—Delivery: Malware with hash key (antivirus signature 4CB5F)

Details for phases 4 to 7 not known yet

The campaign rules "ransom-ware" contains three individual rules triggering offenses:

1. if the number of firewall events "denial" for IP a.b.c.d>100 (general, pre-defined value for firewall denial event threshold),
2. if the email received event comprises as with sender="@benefit-city.com" AND (subject="mail for you" OR subject="photo for you"), or
3. if antivirus event "file stored on disk" with hash key=4CB5F is detected.

This example campaign rule checks very specifically a few attributes against a few known, malicious values; thus, they induce only a tiny load on the rule engine. It may also be noted that on the right side of FIG. 2 an assumed order 408 of rule execution is indicated.

FIG. 5 shows a block diagram 500 of an embodiment of the proposed concept using main building blocks. Two main building blocks are shown: the correlation engine 518 and the TTP specific rules set identifier 520. The security events are received from an event collector 502, e.g., as access rights to one or more security event logs (not shown). The correlation engine 518 accesses the TTP identifying rules 506, which matches the incoming events against known Indicators of compromise. The known indicators of compromise triggers TTP/MEAC identifiers 512 to query and map a relationship and identify additional attack patterns from the TTP/MEAC repository 516. In case of a matching Indicator of Compromise has identified the threatening TTP (Attack Pattern), the rule development engine 514 translates the additional TTP into a small set of campaign-specific rules 508 and activates it in the correlation engine 518.

The rule executor a 504 accesses also the generic rules 510 implemented to monitor non cyber-attack patterns e.g. insider threat (compare FIG. 4, 408). Block 512 of known TTP/MEAC identifiers and the rule development engine for cyber-attack chains 514 are the main building blocks of the TTP specific rules set identifier 520.

Finally, an alert generator 522 may be triggered in case the rule executed in block 504 identifies a security threat.

FIG. 6 shows a block diagram of a flowchart 600 indicating the steps of the inventive concept from a more detailed perspective.

The method of the inventive concept comprises the following steps to enable adaptive correlation to support dynamic memory allocation for correlation rules to detect a full cyber-attack chain for a potential security incident.

Firstly, the security events 602 are sent to an event preprocessor after being collected from the log sources via one or more event collectors. Secondly, the security events are loaded, 604, and processed, 606, by the correlation engine queue manager which handles the number of events that goes through the correlation engine based on system resource availability.

Then, the events which are processed, 606, through the correlation queue go through the correlation rule executor (compare 506), which will have a TTP identifying set of rules loaded into the correlation executor. The events from the queue are checked through rules in the correlation rule executor. Once there is a match with the events and TTP identifying correlation rule—cases "yes"—the rule engine will analyze, 616, the TTP for a creation and/or modification of rules for the full chain.

Additionally, the rule engine will constantly check the TTP/MEAC repository 618 to dynamically develop rules that are applicable to new malware campaign based on TTP/MAEC. Campaign specific rules which are activated are periodically updated with the latest updates on TTP attack patterns and indicators of compromise.

Based on this, additional cyber-attack sequence rules are added—or loaded, 620, respectively—to the rule executor for monitoring additional partial cyber-security attacks along the entire cyber-attack chain.

If during the determination 608 (no match was found—case "no"). The received events are processed, 610, through campaign specific rules (compare FIG. 4, 404) and additionally generic rules (compare FIG. 4, 408), and based on a positive outcome/determination of the rule (612), an alarm will be activated, 614, together with the determined cyber-attack chain level.

It may also be noted that in case of "yes" of the determination 608, also the branch "yes, future correlation" of the flowchart is followed. Namely, additional cyber-attack chain rules are loaded, 622, to the rule executor for monitoring additional cyber-security attacks along the entire cyber-attack chain. Then, a rule would be applied for a mapping of a confidence level regarding a specific cyber-attack chain (compare 624) and based on the outcome of the rule an alarm will be activated, 614, together with the determined cyber-attack chain level.

For completeness reasons, FIG. 7 shows a block diagram of the security information and event monitoring system 700 for dynamically identifying security threats comprising a cyber-attack chain composed of a sequence of partial cyber-attacks represented by attack patterns. The system 700 comprises a receiving unit 702 adapted for receiving a sequence of security events and a determination unit 704 adapted for determining, in the received sequence of security events, a first cyber-attack pattern using a correlation engine by applying a set of predefined rules for a detection of an indicator of compromise of a first partial cyber-attack of the cyber-attack chain, thereby identifying a specific cyber-attack chain. The determination unit 704 is also adapted for determining a type and an attribute in the pattern of the first partial cyber-attack of the identified specific cyber-attack chain.

Additionally, the system 700 comprises also a configuration unit 706 adapted for configuring at least one rule for a downstream partial cyber-attack in the specific cyber-attack chain based on the type and the attribute in the attack pattern of the first partial cyber-attack and an adding module 708 adapted for adding the at least one configured rule to the set of predefined rules to be used by the correlation engine for dynamically identifying security threats to information technology systems.

Embodiments of the invention may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system, and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, security information and event monitoring system 700 for dynamically identifying security threats comprising a cyber-attack chain may be attached to the bus system 806.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In summary, various embodiments have been discussed which are specified in the following numbered clauses:

1. A computer-implemented method for dynamically identifying security threats comprising a cyber-attack chain composed of a sequence of partial cyber-attacks represented by attack patterns, the method comprising:
   receiving a sequence of security events,
   determining, in the received sequence of security events, a first cyber-attack pattern using a correlation engine by applying a set of predefined rules for a detection of an indicator of compromise of a first partial cyber-attack of the cyber-attack chain, thereby identifying a specific cyber-attack chain,
   determining a type and an attribute in the pattern of the first partial cyber-attack of the identified specific cyber-attack chain,
   configuring at least one rule for a downstream partial cyber-attack in the specific cyber-attack chain based on the type and the attribute in the attack pattern of the first partial cyber-attack,
   adding the at least one configured rule to the set of predefined rules to be used by the correlation engine for dynamically identifying security threats to information technology systems.

2. The method of clause 1, further comprising:
   determining, in the received sequence of security events, a second cyber-attack pattern using the correlation engine by applying the configured at least one rule for a detection of a second indicator of compromise in the second cyber-attack of the cyber-attack chain.

3. The method of clause 1 or 2, wherein the set of rules is using information about malware attribute enumeration and characterization and structured threat information expressions.

4. The method of clause 3, further comprising:
   updating the predefined rule set continuously by adding new indicators of compromise.

5. The method of any of the preceding clauses, wherein the adding the at least one configured rule to the set of rules is performed by:
   selectively configuring and/or activating correlation rules, grouping of rules, and/or
   prioritizing the configured and added at least one rule against generic rules.

6. The method of any of the preceding clauses, wherein the configuring the at least one rule for a downstream partial cyber-attack comprises:

using data about tactic-technique-procedure identifying rules, malware attribute enumeration and characterization and structured threat information expressions from a repository.

7. The method of any of the preceding clauses, the configuring the at least one rule for a downstream partial cyber-attack further comprises:
configuring additional rules relating to typical downstream partial cyber-attacks of a cyber-attack chain relating to the determined type and attribute in the pattern of the first partial cyber-attack of the identified specific cyber-attack chain.

8. The method of any of the preceding clauses, further comprising:
triggering an alarm signal after a predefined number of subsequent partial security attacks corresponding to one cyber-attack chain has been determined.

9. The method of any of the preceding clauses, further comprising:
removing the at least one configured rule for a downstream partial cyber-attack in the specific cyber-attack chain in the set of rules if it is determined that a risk value for the specific cyber-attack chain is reduced to below a predetermined risk threshold value.

10. The method of clauses 9, further comprising:
removing the at least one configured rule for a downstream partial cyber-attack in the specific cyber-attack chain if correlation engine using the at least one configured rule did not determine a downstream cyber-attack pattern for a predefined time.

11. The method of clause 9, wherein comprising:
removing a rule relating to at least one configured rule for a downstream partial cyber-attack in the specific cyber-attack chain in the set of rules from the repository of malware attribute enumeration and characterization and structure threat information expressions.

12. A security information and event monitoring system for dynamically identifying security threats comprising a cyber-attack chain composed of a sequence of partial cyber-attacks represented by attack patterns, the system comprising:
a receiving unit adapted for receiving a sequence of security events,
a determination unit adapted for determining, in the received sequence of security events, a first cyber-attack pattern using a correlation engine by applying a set of predefined rules for a detection of an indicator of compromise of a first partial cyber-attack of the cyber-attack chain, thereby identifying a specific cyber-attack chain,
wherein the determination unit is also adapted for determining a type and an attribute in the pattern of the first partial cyber-attack of the identified specific cyber-attack chain,
a configuration unit adapted for configuring at least one rule for a downstream partial cyber-attack in the specific cyber-attack chain based on the type and the attribute in the attack pattern of the first partial cyber-attack,
an adding module adapted for adding the at least one configured rule to the set of predefined rules to be used by the correlation engine for dynamically identifying security threats to information technology systems.

13. The system of clause 12, wherein the determination unit is also adapted for:
determining, in the received sequence of security events, a second cyber-attack pattern using the correlation engine by applying the configured at least one rule for a detection of a second indicator of compromise in the second cyber-attack of the cyber-attack.

14. The system of clause 12 or 13, wherein the set of rules is adapted for:
using information about malware attribute enumeration and characterization and structured threat information expressions.

15. The system of clause 14, further comprising:
an updating unit adapted for updating the predefined rule set continuously by adding new indicators of compromise.

16. The system of any of the clauses 13 to 15, wherein the adding module is also adapted for:
selectively configuring and/or activating correlations rules,
grouping of rules, and/or
prioritizing the configured and added at least one rule against generic rules.

17. The system of any of the preceding clauses 13 to 17, further comprising:
a repository for storing data about tactic-technique-procedure identifying rules, malware attribute enumeration and characterization and structured threat information expressions to be used by the configuration unit.

18. The system of any of the preceding clauses 13 to 18, wherein the configuring unit when configuring the at least one rule for a downstream partial cyber-attack is also adapted for:
configuring additional rules relating to typical downstream cyber-attacks of a cyber-attack chain relating to the determined type and attribute in the pattern of the first partial cyber-attack of the identified specific cyber-attack chain.

19. The system of any of the preceding clauses 13 to 18, further comprising:
an alarm unit adapted for triggering an alarm signal after a predefined number of subsequent partial security attacks corresponding to one cyber-attack chain has been determined.

20. The system of any of the preceding clauses 13 to 19, further comprising:
a removal module adapted for removing the at least one configured rule for a downstream partial cyber-attack in the specific cyber-attack chain in the set of rules if it is determined that a risk value for the specific cyber-attack chain is reduced to below a predetermined risk threshold value.

21. The system of clause 20, wherein the removal module is also adapted for:
removing the at least one configured rule for a downstream partial cyber-attack in the specific cyber-attack chain if correlation engine using the at least one configured rule did not determine a downstream cyber-attack pattern for a predefined time.

22. The system of clause 20, wherein the removal module is also adapted for:
removing a rule relating to at least one configured rule from set of predefined rules.

23. A computer program product for dynamically identifying security threats comprising a cyber-attack chain composed of a sequence of partial cyber-attacks represented by attack patterns, said computer program product comprising a computer readable storage medium having program instructions embodied therewith, said program instructions being executable by one or more computing systems or controllers to cause said one or more computing systems to:

receive a sequence of security events,
determine, in the received sequence of security events, a first cyber-attack pattern using a correlation engine by applying a set of predefined rules for a detection of an indicator of compromise of a first partial cyber-attack of the cyber-attack chain, thereby identifying a specific cyber-attack chain,
determine a type and an attribute in the pattern of the first partial cyber-attack of the identified specific cyber-attack chain,
configure at least one rule for a downstream partial cyber-attack in the specific cyber-attack chain based on the type and the attribute in the attack pattern of the first partial cyber-attack,
add the at least one configured rule to the set of predefined rules to be used by the correlation engine for dynamically identifying security threats to information technology systems.

What is claimed is:

1. A computer-implemented method, comprising: receiving a sequence of security events comprising n security events from different log sources; parsing only the n security events from the different log sources; determining, in the received sequence of security events, a first cyber-attack pattern using a correlation engine by applying a set of predefined rules for a detection of an indicator of compromise of a first partial cyber-attack of a cyber-attack chain, thereby identifying a specific cyber-attack chain having a plurality of phases with at least two phases having distinct types and attributes; determining a type and an attribute in a pattern of the first partial cyber-attack of the identified specific cyber-attack chain; configuring at least one correlation rule of the set of predefined rules for a downstream partial cyber-attack in the specific cyber-attack chain based on the type and the attribute in an attack pattern of the first partial cyber-attack which prepares a security information and event monitoring (SIEM) solution anticipating future partial cyber-attacks, wherein the correlation rule addresses the specific cyber-attack chain at at least one of the phases downstream of the first partial cyber-attack of the specific cyber-attack chain; adding the at least one configured correlation rule to the set of predefined rules to be used by the correlation engine for dynamically identifying security threats to information technology systems, wherein the correlation engine analyzes fewer than n security events based on the adding; and removing the at least one configured correlation rule for a downstream partial cyber-attack in the specific cyber-attack chain in the set of predefined rules, in response to determining that a risk value for the specific cyber-attack chain is reduced to below a predetermined risk threshold value.

2. The method according to claim 1, further comprising: determining, in the received sequence of security events, a second cyber-attack pattern using the correlation engine by applying the configured at least one correlation rule for a detection of a second indicator of compromise in the second cyber-attack of the cyber-attack chain.

3. The method according to claim 1. wherein the set of predefined rules uses information about malware attribute enumeration and characterization and structured threat information expressions.

4. The method according to claim 3, further comprising: updating the set of predefined rules continuously by adding new indicators of compromise.

5. The method according to claim 1, wherein the adding the at least one configured correlation rule to the set of predefined rules is performed by performing an action selected from the group consisting of: selectively configuring and/or activating correlation rules in the set of predefined rules; grouping of the predefined rules; and prioritizing the configured and added at least one correlation rule against generic rules in the set of predefined rules.

6. The method according to claim 1, wherein the configuring the at least one correlation rule for a downstream partial cyber-attack comprises: using data about tactic-technique-procedure identifying rules, malware attribute enumeration and characterization and structured threat information expressions from a repository.

7. The method according to claim 1, wherein the configuring the at least one correlation rule for a downstream partial cyber-attack further comprises: configuring additional correlation rules relating to typical downstream partial cyber-attacks of a cyber-attack chain relating to the determined type and attribute in the pattern of the first partial cyber-attack of the identified specific cyber-attack chain.

8. The method according to claim 1, further comprising: constantly checking a repository to dynamically develop rules that are applicable to new malware campaigns based on tactic-technique-procedure (TTP), malware attribute enumeration and characterization (MEAC); monitoring additional partial cyber-security attacks along an entire cyber-attack chain; processing received events of the cyber-security attacks through campaign specific rules and generic rules, and triggering an alarm signal after a predefined number of subsequent partial security attacks corresponding to one cyber-attack chain has been determined.

9. The method according to claim 1, further comprising: removing the at least one configured correlation rule for a downstream partial cyber-attack in the specific cyber-attack chain in the set of predefined rules if it is determined that a risk value for the specific cyber-attack chain is reduced to below a predetermined risk threshold value.

10. The method according to claim 9, further comprising: removing the at least one configured correlation rule for a downstream partial cyber-attack in the specific cyber-attack chain if correlation engine using the at least one configured correlation rule did not determine a downstream cyber-attack pattern for a predefined time.

11. The method according to claim 9, further comprising: removing a rule relating to at least one configured correlation rule for a downstream partial cyber-attack in the specific cyber-attack chain in the set of predefined rules from the repository of malware attribute enumeration and characterization and structure threat information expressions.

12. A computer system, comprising: a processor; and a computer readable storage device storing programming instructions for execution by the processor, the program instructions comprising instructions for: receiving a sequence of security events comprising n security events from different log sources; parsing only the n security events from the different log sources; determining, in the received sequence of security events, a first cyber-attack pattern using a correlation engine by applying a set of predefined rules for a detection of an indicator of compromise of a first partial cyber-attack of a cyber-attack chain, thereby identifying a specific cyber-attack chain having a plurality of phases with at least two phases having distinct types and attributes; determining a type and an attribute in a pattern of the first partial cyber-attach of the identified specific cyber-attack chain; configuring at least one correlation rule of the set of predefined rules for a downstream partial cyber-attack in the specific cyber-attack chain based on the type and the attribute in an attack pattern of the first partial cyber-attack which prepares a security information and event monitoring (STEM) solution anticipating future partial cyber-attacks, wherein the correlation rule addresses the specific cyber-attack chain at at least one of the phases downstream of the first partial cyber-attack of the specific cyber-attack chain anticipating future partial cyber-attacks in the specific cyber-attack chain: adding the at least one configured correlation rule to the set of predefined rules to be used by the correlation engine for dynamically identifying security threats to information technology systems, wherein the correlation engine analyzes fewer than n security events based on the adding; and removing the at least one configured correlation rule for a downstream. partial cyber-attack in the specific cyber-attack chain in the set of predefined rules, in response to determining that a risk value for the specific cyber-attack chain is reduced to below a predetermined risk threshold value.

13. The system according to claim 12, wherein instructions for determining comprise instructions for: determining, in the received sequence of security events, a second cyber-attack pattern using the correlation engine by applying the configured at least one correlation rule for a detection of a second indicator of compromise in the second cyber-attack of the cyber-attack.

14. The system according to claim 12, wherein the set of predefined rules comprises: using information about malware attribute enumeration and characterization and structured threat information expressions.

15. The system according to claim 14, further comprising instructions for: updating the set of predefined rules continuously by adding new indicators of compromise.

16. The system according to claim 12, wherein instructions for adding further comprise instructions for performing an action selected from the group consisting of: selectively configuring and/or activating correlations rules in the set of predefined rules; grouping of the predefined rules; and prioritizing the configured. and added at least one correlation rule against generic rules in the set of predefined rules.

17. The system according to claim 12, further comprising: a repository for storing data about tactic-technique-procedure identifying rules, malware attribute enumeration and characterization and structured threat information expressions to he used 1w the instructions for configuring.

18. The system according to claim 12, wherein the instructions for configuring the at least one correlation rule for a downstream partial cyber-attack comprise instructions for: configuring additional correlation rules relating to typical downstream cyber-attacks of a cyber-attack chain relating to the determined type and attribute in the pattern of the first partial cyber-attack of the identified specific cyber-attack chain.

19. The system according to claim 12, further comprising instructions for: triggering an alarm signal after a predefined number of subsequent partial security attacks corresponding to one cyber-attack chain has been determined.

20. The system according to claim 12, wherein the instructions for removing comprise: removing the at least one configured correlation rule for a downstream partial cyber-attack in the specific cyber-attack chain, in response to determining that the correlation engine using the at least one configured correlation rule did not determine a downstream cyber-anack pattern for a predefined time.

21. The system according to claim 12, wherein the instructions for removing comprise instructions for: removing a rule relating to at least one configured correlation rule from the set of predefined rules.

22. A computer program product for dynamically identifying security threats comprising a cyber-attack chain composed of a sequence of partial cyber-attacks represented by attack patterns, said computer program product comprising a computer readable storage medium having program instructions embodied therewith, said program instructions being executable by one or more processors of one or more computing systems or controllers to execute a method, the program instructions comprising instructions for: receiving a sequence of security events comprising n security events from different log sources: parsing only the n security events from the different log sources; determining, in the received sequence of security events, a first cyber-attack pattern using a correlation engine by applying a set of predefined correlation rules for a detection of an indicator of compromise of a first partial cyber-attack the cyber-attack chain, thereby identifying a specific cyber-attack chain having a plurality of phases with at least two phases having distinct types and attributes; determining a type and an attribute in a pattern of the first partial cyber-attack of the identified specific cyber-attack chain: configuring at least one correlation rule of the set of predefined correlation rules for a downstream partial cyber-attack in the specific cyber-attack chain based on the type and the attribute in an attack pattern of the first partial cyber-attack which prepares a security information and event monitoring (SIEM) solution anticipating future partial cyber-attacks, wherein the correlation rule addresses the specific cyber-attack chain at at least one of the phases of the specific cyber-attack chain and the downstream partial cyber-attack follows the first partial cyber-attack in the cyber-attack chain; adding the at least one configured correlation rule to the set of predefined correlation rules to be used by the correlation engine for dynamically identifying security threats to information technology systems by selectively configuring and/or activating correlations rules in the set of predefined rules, wherein the correlation engine analyzes fewer than n security events based on the adding; and removing the at least one configured correlation rule for a downstream partial cyber-attack in the specific cyber-attack chain in the set of predefined rules, in response to determining that a risk value for the specific cyber-attack chain is reduced to below a predetermined risk threshold value.

* * * * *